(12) United States Patent
Xi et al.

(10) Patent No.: US 12,526,632 B2
(45) Date of Patent: Jan. 13, 2026

(54) MAN-IN-THE-MIDDLE DETECTION METHOD AND APPARATUS

(71) Applicant: HUAWEI TECHNOLOGIES CO., LTD., Shenzhen (CN)

(72) Inventors: Yan Xi, Shanghai (CN); Xiaochun Xiong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 453 days.

(21) Appl. No.: 18/308,072

(22) Filed: Apr. 27, 2023

(65) Prior Publication Data

US 2024/0080669 A1 Mar. 7, 2024

Related U.S. Application Data

(63) Continuation of application No. PCT/CN2020/124992, filed on Oct. 29, 2020.

(51) Int. Cl.
*H04W 12/06* (2021.01)
*H04L 9/40* (2022.01)
*H04W 12/08* (2021.01)
*H04W 12/106* (2021.01)
*H04W 12/12* (2021.01)
(Continued)

(52) U.S. Cl.
CPC ....... *H04W 12/122* (2021.01); *H04L 63/1466* (2013.01); *H04W 12/106* (2021.01)

(58) Field of Classification Search
CPC .............. H04W 12/122; H04W 12/106; H04L 63/1466
USPC ......................................................... 455/411
See application file for complete search history.

(56) References Cited

U.S. PATENT DOCUMENTS

| 2020/0236554 | A1* | 7/2020 | Lee | ........................ H04W 12/03 |
| 2020/0288313 | A1* | 9/2020 | Kunz | ................... H04W 12/104 |
| 2020/0344605 | A1* | 10/2020 | Lee | ...................... H04W 12/106 |

(Continued)

FOREIGN PATENT DOCUMENTS

| CN | 102223632 A | 10/2011 |
| CN | 110545253 A | 12/2019 |

OTHER PUBLICATIONS

IP.com Search History (Year: 2025).*

(Continued)

*Primary Examiner* — Moustapha Diaby
(74) *Attorney, Agent, or Firm* — HAUPTMAN HAM, LLP

(57) ABSTRACT

A man-in-the-middle detection method and apparatus. The method includes: A base station receives, in a first physical frame, a RRC message from user equipment UE; the base station receives from the UE a second RRC message including frame information of a second physical frame, and security protection is performed on the first RRC message and the second RRC message by using an access stratum AS security context established by the UE and the base station; and the base station determines whether the first physical frame matches the second physical frame. Thereby, whether a man-in-the-middle exists in air interface communication is determined by determining whether a physical frame in which the UE sends an uplink message matches a physical frame in which the base station receives the uplink message, to prevent the man-in-the-middle from bypassing detection through a mechanism of the man-in-the-middle and improve a man-in-the-middle detection rate.

20 Claims, 8 Drawing Sheets

(51) Int. Cl.
*H04W 12/122* (2021.01)
*H04W 88/02* (2009.01)

(56) References Cited

U.S. PATENT DOCUMENTS

2022/0210645 A1* 6/2022 Takahashi .............. H04W 8/24
2022/0417753 A1* 12/2022 Cho ........................ H04K 3/22

OTHER PUBLICATIONS

European Office Action issued in corresponding European Application No. 20959157.7, dated Oct. 30, 2024, pp. 1-5.
Extended European Search Report issued in corresponding European Application No. 20959157.7, dated Oct. 26, 2023, pp. 1-7.
International Search Report issued in corresponding International Application No. PCT/CN2020/124992, dated Jul. 15, 2021, pp. 1-10.

* cited by examiner

MAN-IN-THE-MIDDLE DETECTION METHOD AND APPARATUS

CROSS-REFERENCE TO RELATED APPLICATIONS

This application is a continuation of International Application No. PCT/CN2020/124992, filed on Oct. 29, 2020, the disclosure of which is hereby incorporated in entirety by reference.

BACKGROUND

In a wireless communication system, radio resource control (radio resource control, RRC) signaling or user plane data is sent between user equipment (user equipment, UE) and a base station. However, attackers deploys a false base station between the UE and the base station to eavesdrop, tamper with, forge, inject, and release an air interface message, causing a DoS attack to a terminal and a network.

A man-in-the-middle is a type of false base station, including a false base station part function and a false UE part function. In response to UE being in an idle state, in response to the UE approaching a false base station, and detects that signal quality of a cell of the false base station is good and meets a cell reselection condition, the UE triggers a cell reselection process and camps on the cell of the false base station. In response to UE being in a connected state, in response to the UE approaching a false base station, and detects that signal quality of a cell of the false base station is good, the UE reports a measurement result to a serving cell. The serving cell triggers handover of the UE to the cell of the false base station, to enable the UE to camp on the cell of the false base station. The false UE part function is used to forward or modify communication data of real UE, access a real base station as the real UE, and communicate with an access and mobility management function (access and mobility management function, AMF) based on an N2 protocol. For a network side and a terminal side to perceive a man-in-the-middle is usually difficult.

A current method for discovering a man-in-the-middle is usually as follows: A hash HASH value of a received master information block (master information block, MIB)/system information block (system information block, SIB) is calculated by UE, and the hash value of the MIB/SIB is carried in a measurement report (measurement report, MR)/logged MR to be reported to a real base station. The real base station calculates a hash value of the MIB/SIB and compares the hash value with the value reported by the UE; and in response to the two values being inconsistent, determines that a man-in-the-middle exists.

However, in response to the man-in-the-middle completely imitating the MIB/SIB of the real base station, the method is unable to be used to detect the man-in-the-middle.

Therefore, providing a man-in-the-middle detection method that prevents a man-in-the-middle from bypassing detection through a mechanism of the man-in-the-middle is an urgent problem to be resolved currently.

SUMMARY

Some embodiments provide a man-in-the-middle detection method and apparatus, to effectively improve an air interface man-in-the-middle detection rate and prevent a man-in-the-middle from bypassing a detection mechanism through technical means.

In some embodiments, a man-in-the-middle detection method is provided. The method includes: A base station receives, in a first physical frame, a first radio resource control RRC message from user equipment UE; the base station receives a second RRC message from the UE, where the second RRC message includes frame information of a second physical frame, and security protection is performed on the first RRC message and the second RRC message by using an access stratum AS security context established by the UE and the base station; and the base station determines whether the first physical frame matches the second physical frame.

In some embodiments the frame information of the second physical frame includes a frame number and a subframe number of the second physical frame.

In some embodiments that the base station determines whether the first physical frame matches the second physical frame includes: In response to a frame number of the first physical frame being the same as the frame number of the second physical frame and a subframe number of the first physical frame is the same as the subframe number of the second physical frame, the base station determines that the first physical frame matches the second physical frame; otherwise, the base station determines that the first physical frame does not match the second physical frame.

In some embodiments, after that a base station receives, in a first physical frame, a first radio resource control RRC message from UE, the method further includes: The base station stores frame information of the first physical frame.

In some embodiments, before that a base station receives, in a first physical frame, a first radio resource control RRC message from UE, the method further includes: The base station establishes the AS security context with the UE.

In some embodiments, before that a base station receives, in a first physical frame, a first RRC message from UE, the method further includes: The base station sends indication information to the UE, where the indication information indicates the UE to enable man-in-the-middle detection.

In some embodiments, a man-in-the-middle detection method is provided. The method includes: User equipment UE sends, in a second physical frame, a first radio resource control RRC message to a base station; and the UE sends a second RRC message to the base station, where the second RRC message includes frame information of the second physical frame, and security protection is performed on the first RRC message and the second RRC message by using an access stratum AS security context established by the UE and the base station.

In some embodiments, the frame information of the second physical frame includes a frame number and a subframe number of the second physical frame.

In some embodiments, before that user equipment UE sends, in a second physical frame, a first radio resource control RRC message to a base station, the method further includes: The UE receives downlink control information DCI, where the DCI is used to determine the frame information of the second physical frame; and the UE stores the frame information of the second physical frame.

In some embodiments, before that user equipment UE sends, in a second physical frame, a first radio resource control RRC message to a base station, the method further includes: The UE accesses the base station, and establishes the AS security context with the base station.

In some embodiments, that user equipment UE sends, in a second physical frame, a first radio resource control RRC message to a base station includes: In response to a preset rule being met, the UE sends, in the second physical frame, the first RRC message to the base station.

In some embodiments, the preset rule includes: The UE receives indication information sent by the base station, where the indication information indicates the UE to enable man-in-the-middle detection; or the UE determines that user plane integrity protection between the UE and the base station is not enabled.

In some embodiments, a man-in-the-middle detection method is provided. The method includes: User equipment UE sends, in a third physical frame, a third radio resource control RRC message to a base station; the UE receives a fourth RRC message from the base station, where the fourth RRC message includes frame information of a fourth physical frame; the UE determines whether the third physical frame matches the fourth physical frame; and the UE sends a fifth RRC message to the base station, where the fifth RRC message indicates whether the third physical frame matches the fourth physical frame, and security protection is performed on the third RRC message, the fourth RRC message, and the fifth RRC message by using an access stratum AS security context established by the UE and the base station.

In some embodiments, the frame information of the fourth physical frame includes a frame number and a subframe number of the fourth physical frame.

In some embodiments, that the UE determines whether the third physical frame matches the fourth physical frame includes: In response to a frame number of the third physical frame being the same as the frame number of the fourth physical frame and a subframe number of the third physical frame is the same as the subframe number of the fourth physical frame, the UE determines that the third physical frame matches the fourth physical frame; otherwise, the UE determines that the third physical frame does not match the fourth physical frame.

In some embodiments, before that user equipment UE sends, in a third physical frame, a third radio resource control RRC message to a base station, the method further includes: The UE receives downlink control information DCI, where the DCI is used to determine frame information of the third physical frame, and the frame information of the third physical frame includes the frame number and the subframe number of the third physical frame; and the UE stores the frame information of the third physical frame.

In some embodiments, before that user equipment UE sends, in a third physical frame, a third radio resource control RRC message to a base station, the method further includes: The UE accesses the base station, and establishes the AS security context with the base station.

In some embodiments, that user equipment UE sends, in a third physical frame, a third radio resource control RRC message to a base station includes: In response to a preset rule being met, the UE sends, in the second physical frame, the third RRC message to the base station.

In some embodiments, the first preset rule includes: The UE receives indication information sent by the base station, where the indication information indicates the UE to enable man-in-the-middle detection; or the UE determines that user plane integrity protection between the UE and the base station is not enabled.

In some embodiments, a man-in-the-middle detection method is provided. The method includes: A base station receives, in a fourth physical frame, a third RRC message from user equipment UE; the base station sends a fourth RRC message to the UE, where the fourth RRC message includes frame information of the fourth physical frame; the base station receives a fifth RRC message sent by the UE; and the base station determines, based on the fifth RRC message, whether a man-in-the-middle exists between the base station and the UE.

In some embodiments, the fifth RRC message indicates whether a third physical frame matches the fourth physical frame, and the third physical frame is a physical frame in which the UE sends the third RRC message. That the base station determines, based on the fifth RRC message, whether a man-in-the-middle exists between the base station and the UE includes: In response to the third physical frame not matching the fourth physical frame, the base station determines that a man-in-the-middle exists between the base station and the UE; or in response to the third physical frame matching the fourth physical frame, the base station determines that no man-in-the-middle exists between the base station and the UE.

In some embodiments, the frame information of the fourth physical frame includes a frame number and a subframe number of the fourth physical frame.

In some embodiments, before that a base station receives, in a fourth physical frame, a third RRC message sent by user equipment UE, the method further includes: The base station establishes an AS security context with the UE.

In some embodiments, before that a base station receives, in a fourth physical frame, a third RRC message from user equipment UE, the method further includes: The base station sends indication information to the UE, where the indication information indicates the UE to enable man-in-the-middle detection.

In some embodiments, a man-in-the-middle detection apparatus is provided. The apparatus includes: a transceiver module, configured to receive, in a first physical frame, a first radio resource control RRC message from user equipment UE, where the transceiver module is further configured to receive a second RRC message from the UE, where the second RRC message includes frame information of a second physical frame, and security protection is performed on the first RRC message and the second RRC message by using an access stratum AS security context established by the UE and a base station; and a processing module, configured to determine whether the first physical frame matches the second physical frame.

In some embodiments, the frame information of the second physical frame includes a frame number and a subframe number of the second physical frame.

In some embodiments, the processing module is configured to: in response to a frame number of the first physical frame being the same as the frame number of the second physical frame and a subframe number of the first physical frame is the same as the subframe number of the second physical frame, determine, by the base station, that the first physical frame matches the second physical frame; otherwise, determine, by the base station, that the first physical frame does not match the second physical frame.

In some embodiments, the processing module is further configured to store frame information of the third physical frame.

In some embodiments, the processing module is further configured to establish the AS security context with the UE.

In some embodiments, the transceiver module is further configured to send indication information to the UE, where the indication information indicates the UE to enable man-in-the-middle detection.

In some embodiments, a man-in-the-middle detection apparatus is provided. The apparatus includes a transceiver module, configured to send, in a second physical frame, a first radio resource control RRC message to a base station.

The transceiver module is further configured to send a second RRC message to the base station. The second RRC message includes frame information of the second physical frame, and security protection is performed on the first RRC message and the second RRC message by using an access stratum AS security context established by UE and the base station.

In some embodiments, the frame information of the second physical frame includes a frame number and a subframe number of the second physical frame.

In some embodiments, the transceiver module is further configured to receive downlink control information DCI, where the DCI is used to determine the frame information of the second physical frame. The apparatus further includes a processing module, where the processing module is configured to store the frame information of the second physical frame.

In some embodiments, the processing module is further configured to access the base station and establish the AS security context with the base station.

In some embodiments, the transceiver module is configured to: in response to a preset rule being met, send, by the UE in the second physical frame, the first RRC message to the base station.

In some embodiments, the preset rule includes: The UE receives indication information sent by the base station, where the indication information indicates the UE to enable man-in-the-middle detection; or the UE determines that user plane integrity protection between the UE and the base station is not enabled.

In some embodiments, a man-in-the-middle detection apparatus is provided. The apparatus includes: a transceiver module, configured to send, in a third physical frame, a third radio resource control RRC message to a base station. The transceiver module is further configured to receive a fourth RRC message from the base station, where the fourth RRC message includes frame information of a fourth physical frame; and the transceiver module is further configured to send a fifth RRC message to the base station, where the fifth RRC message indicates whether the third physical frame matches the fourth physical frame, and security protection is performed on the third RRC message, the fourth RRC message, and the fifth RRC message by using an access stratum AS security context established by UE and the base station.

In some embodiments, the frame information of the fourth physical frame includes a frame number and a subframe number of the fourth physical frame.

In some embodiments, the processing module is configured to: in response to a frame number of the third physical frame being the same as the frame number of the fourth physical frame and a subframe number of the third physical frame is the same as the subframe number of the fourth physical frame, determine, by the UE, that the third physical frame matches the fourth physical frame; otherwise, determine, by the UE, that the third physical frame does not match the fourth physical frame.

In some embodiments, the transceiver module is further configured to receive downlink control information DCI, where the DCI is used to determine frame information of the third physical frame, and the frame information of the third physical frame includes the frame number and the subframe number of the third physical frame.

The processing module is further configured to store the frame information of the third physical frame.

In some embodiments, the processing module is further configured to access the base station and establish the AS security context with the base station.

In some embodiments, the first preset rule includes:

The UE receives indication information sent by the base station, where the indication information indicates the UE to enable man-in-the-middle detection; or the UE determines that user plane integrity protection between the UE and the base station is not enabled.

In some embodiments, a man-in-the-middle detection apparatus is provided. The apparatus includes: a transceiver module, configured to receive, in a fourth physical frame, a third RRC message from user equipment UE, where the transceiver module is further configured to send a fourth RRC message to the UE, where the fourth RRC message includes frame information of the fourth physical frame; and the transceiver module is further configured to receive a fifth RRC message sent by the UE; and a processing module, configured to determine, based on the fifth RRC message, whether a man-in-the-middle exists between a base station and the UE.

In some embodiments, the fifth RRC message indicates whether a third physical frame matches the fourth physical frame, and the third physical frame is a physical frame in which the UE sends the third RRC message. The processing module is configured to: in response to the third physical frame not matching the fourth physical frame, determine that the man-in-the-middle exists between the base station and the UE; or in response to the third physical frame matching the fourth physical frame, determine that no man-in-the-middle exists between the base station and the UE.

In some embodiments, the frame information of the fourth physical frame includes a frame number and a subframe number of the fourth physical frame.

In some embodiments, the processing module is further configured to establish an AS security context with the UE.

In some embodiments, the transceiver module is further configured to send indication information to the UE, where the indication information indicates the UE to enable man-in-the-middle detection.

In some embodiments, a communication apparatus is provided. The apparatus includes a processor, configured to execute a computer program stored in a memory, to enable the communication apparatus to perform the communication method in any one of the embodiments.

In some embodiments, a computer-readable storage medium is provided. The computer-readable storage medium stores a computer program. In response to the computer program being run on a computer, the computer is enabled to perform the communication method in any one of the embodiments.

In some embodiments, a chip system is provided. The chip system includes a processor, configured to invoke a computer program from a memory and run the computer program, to enable the communication device installed with the chip system to perform the communication method in any one of the embodiments.

DESCRIPTION OF EMBODIMENTS

The following describes technical solutions with reference to the accompanying drawings in the discussed embodiments.

The technical solutions in some embodiments are applied to various communication systems, for example, a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), and a new radio (new radio, NR) system.

Figure 1:
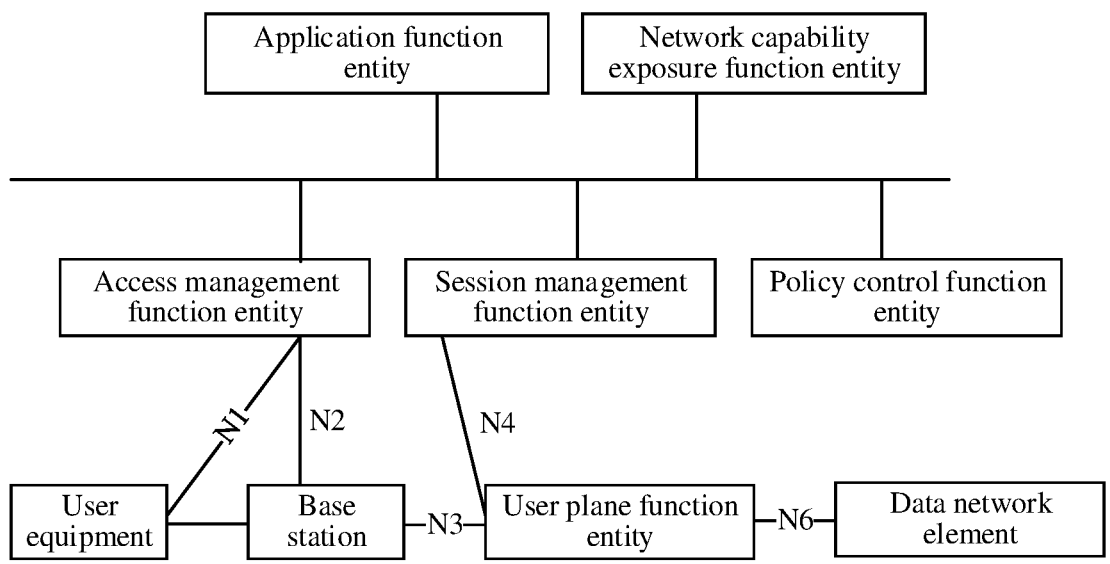
FIG. 1 is an example diagram of a system architecture, in accordance with some embodiments.

The following describes a structure of a communication system in some embodiments with reference to FIG. 1. As shown in FIG. 1, the communication system includes but is not limited to the following network elements.

1. User Equipment (User Equipment, UE)

The UE in some embodiments further are referred to as a mobile station (mobile station, MS), a mobile terminal (mobile terminal, MT), an access terminal, a subscriber unit, a subscriber station, a mobile station, a remote station, a remote terminal, a mobile device, a user terminal, a terminal, a wireless communication device, a user agent, a user apparatus, and the like.

The UE is a device that provides a voice/data connectivity for a user, for example, a handheld device or a vehicle-mounted device that has a wireless connection function. Currently, examples of some terminals are a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a calculating device or another processing device connected to a wireless modem, a vehicle-mounted device, a wearable device, UE in a future 5G network, or UE in a future evolved public land mobile network (public land mobile network, PLMN). This is not limited in some embodiments.

By way of example, and not limitation, in some embodiments, the UE alternatively is a wearable device. The wearable device further is referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on a body or integrated into clothes or an accessory of a user. The wearable device is not a hardware device, but further implements a powerful function through software support, data exchange, and cloud interaction. A generalized wearable intelligent device includes a full-featured and large-size device that implements complete or partial functions without depending on a smartphone, such as a smart watch or smart glasses, and a device that focuses on one type of application functions and works with another device such as a smartphone, for example, various smart bands or smart jewelry for monitoring a physical sign.

In addition, in some embodiments, the UE alternatively is UE in an internet of things (Internet of things, IoT) system. An IoT is a part of future information technology development. A main technical feature of the IoT is that an article is connected to a network by using a communication technology, to implement an intelligent network for human-machine interconnection and thing-thing interconnection.

In some embodiments, the IoT technology implements massive connections, in-depth coverage, and terminal power saving by using, for example, a narrow band (narrow band) NB technology. For example, an NB includes one resource block (resource block, RB). In other words, a bandwidth of the NB is 180 KB. To implement massive access, a terminal performs discrete access. According to a communication method in some embodiments, a congestion problem that occurs in the IoT technology in response to massive terminals accessing a network through the NB is effectively resolved.

In addition, in some embodiments, the UE further communicates with UE in another communication system. For example, the UEs perform inter-device communication. For example, the UE further transmits (for example, send and/or receive) a time synchronization packet with UE in another communication system.

2. Base Station

In addition, the base station in some embodiments are a device configured to communicate with UE. The base station further is referred to as an access network device or a radio access network device. For example, the base station is an evolved NodeB (evolved NodeB, eNB or eNodeB) in an LTE system, or a radio controller in a cloud radio access network (cloud radio access network, CRAN) scenario. Alternatively, the base station is a relay station, an access point, a vehicle-mounted device, a wearable device, a base station in a future 5G network, a base station in a future evolved PLMN network, an access point (access point, AP)

in a WLAN, or a gNB in a new radio (new radio, NR) system. This is not limited in some embodiments.

In addition, in some embodiments, the base station is a device in a RAN, that is, a RAN node that enables UE to access a wireless network. For example, by way of example, and not limitation, the base station is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (such as a home evolved NodeB, or home NodeB, HNB), or a base band unit (base band unit, BBU). In a network structure, a network device includes a central unit (central unit, CU) node, a distributed unit (distributed unit, DU) node, a RAN device including a CU node and a DU node, or a RAN device including a CU control plane node (CU-CP node), a CU user plane node (CU-UP node), and a DU node.

The base station serves a cell. UE communicates with the base station by using a transmission resource (for example, a frequency domain resource or a spectrum resource) used for the cell. The cell is a cell corresponding to the base station (for example, the base station). The cell belongs to a macro base station, or a base station corresponding to a small cell (small cell). The small cell herein includes a metro cell (metro cell), a micro cell (micro cell), a pico cell (pico cell), a femto cell (femto cell), or the like. These small cells have features of small coverage and low transmit power, and are applicable to providing a high-speed data transmission service.

In addition, a plurality of cells simultaneously operates in a same frequency on a carrier in an LTE system or a 5G system. In some embodiments, a concept of the carrier is equivalent to that of the cell. For example, in a carrier aggregation (carrier aggregation, CA) scenario, in response to a secondary component carrier being configured for UE, a carrier index of the secondary component carrier and a cell identifier (cell identifier, Cell ID) of a secondary cell working on the secondary component carrier are both carried. In some embodiments, the concept of the carrier is equivalent to that of the cell. For example, for UE, accessing a carrier is equivalent to accessing a cell.

3. Access Management Function Entity

The access management function entity is mainly configured to perform mobility management, access management, and the like, and is configured to implement functions other than a session management function in functions of a mobility management entity (mobility management entity, MME) in an LTE system, for example, functions such as lawful interception and access authorization/authentication.

In a 5G communication system, an access management network element is an access management function (access and mobility management function, AMF) entity.

In a future communication system, the access management function entity still is an AMF entity, or has another name. This is not limited in some embodiments.

In some embodiments, the entities or the functions are network elements in a hardware device, is software functions run on dedicated hardware, or is virtualized functions instantiated on a platform (for example, a cloud platform).

The foregoing network elements or entities included in the communication system are examples for descriptions. This is not particularly limited in some embodiments.

Figure 2:
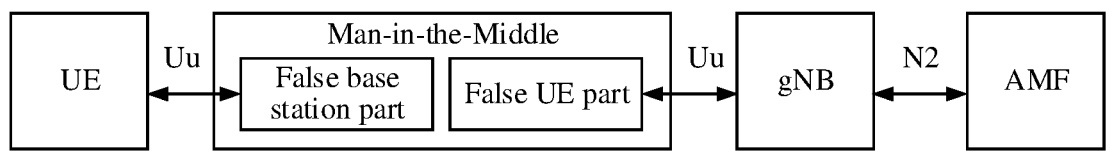
FIG. 2 is an architectural diagram of working of a man-in-the-middle according to some embodiments.

FIG. 2 is an architectural diagram of working of a man-in-the-middle. In some embodiments, from FIG. 2 the man-in-the-middle includes a false base station part and a false UE part. The false base station part is configured to attract UE to camp on a man-in-the-middle cell, and the false UE part is configured to access a real base station, and forward or modify communication data of real UE. An AMF network element is a network element that is mainly responsible for access and mobility management. A base station (a gNB in FIG. 2) and the AMF are connected through an N2 interface. The interface is similar to an S1 interface, and transmits a message exchanged between a RAN and the AMF. UE communicates with the AMF through an N1/NAS interface to transmit a message exchanged between the UE and the AMF. Usually, the RAN forwards the message to the AMF. The UE and the base station are connected through a Uu interface, and the UE and the base station sends RRC signaling and user plane data. The base station is connected to the AMF through the N2 interface, and the base station communicates with the AMF based on an N2 protocol.

Such a man-in-the-middle eavesdrops, tamper with, forge, inject, and release an air interface message, causing a DoS attack to a terminal and a network. For a network side and a terminal side to perceive a man-in-the-middle is usually difficult.

For ease of description, the following first describes a physical frame in air interface communication by using a frame structure in an LTE system and an NR system as an example.

The physical frame usually refers to a protocol data unit at a data link layer. The physical frame includes several parts that perform different functions. The frame structure refers to frames that forms different repetition periodicities based on different transmitted information. To meet a condition of uplink and downlink time conversion in time division multiplexing, in TD-LTE, a dedicated radio frame structure is designed. In TD-LTE time domain, there are two types of frame structures for periodic simultaneous transmission with a quantity of uplink and downlink subframes in a standard configuration: a radio frame and a half-frame. Duration of the radio frame is 10 ms, and duration of the half-frame is 5 ms. One radio frame includes two half-frames. Each half-frame includes five subframes whose duration is 1 ms, each subframe includes two slots whose duration is 0.5 ms, and each slot includes six or seven CP+OFDM symbols based on different cyclic prefix CP duration.

Compared with a fixed 4G frame structure, the most distinctive feature of a 5G frame structure is flexibility and variability. A 5G frame uses a hierarchical structure and includes two parts: a fixed architecture and a flexible architecture. The fixed architecture is the same as that in 4G, and includes a radio frame whose duration is 10 ms and a subframe whose duration is 1 ms. Each frame is divided into two half-frames. The first half-frame includes subframes 0 to 4, and the second half-frame includes subframes 5 to 9. Each subframe includes several slots.

In an LTE system or an NR system, a system frame number (system frame number, SFN) ranges from 0 to 1023, that is, a data sending periodicity is 1024 frames. A subframe number ranges from 0 to 9, that is, a sending periodicity of a part of control information is 10 subframes.

The following describes in detail a man-in-the-middle detection method in some embodiments with reference to FIG. 3 to FIG. 7.

Figure 3:
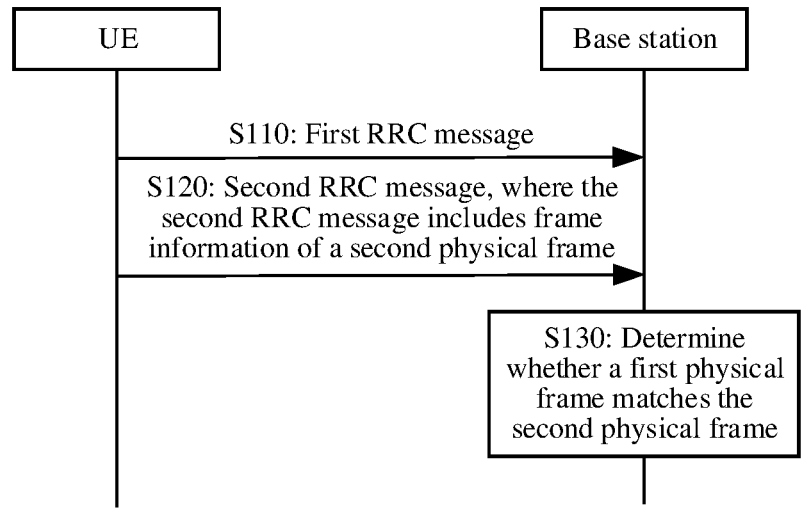
FIG. 3 is a schematic interaction diagram of an example of a man-in-the-middle detection method according to some embodiments.

FIG. 3 is a schematic flowchart of a man-in-the-middle detection method 100 according to some embodiments. From FIG. 3 the method 100 includes the following steps.

S110: A base station receives, in a first physical frame, a first RRC message sent by UE.

S120: The base station receives a second RRC message sent by the UE, where the second RRC message includes frame information of a second physical frame.

S130: The base station determines whether the first physical frame matches the second physical frame.

After successfully establishing an AS security context with the UE, the base station receives, in the first physical frame, the first RRC message from the UE. Then, the base station receives the second RRC message on which security protection is performed from the UE. The UE provides the frame information of the second physical frame for the base station by using the second RRC message. The frame information of the second physical frame is a physical frame in which the UE sends the first RRC message. In response to a man-in-the-middle attack existing, air interface communication between the base station and the UE is intercepted by the man-in-the-middle. An air interface between the UE and a false base station and an air interface between false UE and the base station are independent of each other, that is, the base station is unable to directly receive the first RRC message sent by the UE. The man-in-the-middle receives the first RRC message through the false base station, and forwards the first RRC message to the base station through the false UE. Security protection is performed on the first RRC message by using an access stratum security context established by the UE and the base station. Therefore, the man-in-the-middle is unable to crack or tamper with the first RRC message. After the man-in-the-middle attack occurs between the UE and the base station, a physical frame in which the UE sends an uplink message is unable to be consistent with a physical frame in which the base station receives the uplink message. Therefore, in response to the first physical frame matching the second physical frame, the base station determines that no man-in-the-middle exists between the UE and the base station. In response to the first physical frame not matching the second physical frame, the base station determines that a man-in-the-middle exists between the UE and the base station.

Therefore, according to the man-in-the-middle detection method in some embodiments, whether the man-in-the-middle exists in the air interface communication is determined by determining whether the physical frame in which the UE sends the uplink message matches the physical frame in which the base station receives the uplink message, to prevent the man-in-the-middle from bypassing detection through a mechanism of the man-in-the-middle and improve a man-in-the-middle detection rate.

According to the method 100, a basis of the man-in-the-middle detection method in some embodiments is as follows: In response to the man-in-the-middle attack existing between the UE and the base station, the physical frame in which the UE sends the uplink message is unable to match the physical frame in which the base station receives the uplink message. In other words, frame information of the physical frame in which the UE sends the uplink message is inconsistent with frame information of the physical frame in which the base station receives the uplink message. For example, in an uplink scheduling request mechanism shown in FIG. 4, in response to the man-in-the-middle existing between the UE and the base station, an uplink message, for example, the first RRC message, sent by the UE to the base station is unable to be directly received by the base station. The base station receives the first RRC message transparently transmitted by the man-in-the-middle. In this case, frame information of a physical frame in which the man-in-the-middle sends the uplink message through false UE is unable to be consistent with frame information of a physical frame in which real UE sends the uplink message. The process 200 shown in FIG. 4 includes the following steps.

S210: The UE sends a first scheduling request (scheduling request, SR) to the man-in-the-middle.

In response to the man-in-the-middle attack existing, the UE and the base station are indirectly connected through the man-in-the-middle, that is, the man-in-the-middle establishes connections to the real UE and a real base station separately through the false base station and the false UE. After the connections are established, the UE sends the first SR to the false base station to apply for an uplink transmission resource.

S220: The man-in-the-middle sends first downlink control information (downlink control information, DCI) to the UE.

After receiving the first SR sent by the UE, the man-in-the-middle sends the first DCI to the UE, and indicates an appropriate available resource to the UE by using the first DCI.

S230: The UE sends the first RRC message to the man-in-the-middle.

The UE receives the first DCI sent by the man-in-the-middle, determines a physical frame a based on the first DCI, and sends the first RRC message to the man-in-the-middle in the physical frame a.

For example, after receiving the first DCI in a subframe n, the UE sends the first RRC message to the man-in-the-middle in a subframe n+x. A physical frame in which the subframe n+x is located is the physical frame a. In some embodiments, in an LTE system, x is a value described in a protocol, and in a unified configuration, the value of x is fixed. For example, in a frequency division duplex (frequency division duplex, FDD) scenario, the value of x is fixed to 4. For details, refer to chapter 8 of the protocol 3GPP TS 36.213. For another example, in an NR system, the UE receives the first DCI, where the first DCI carries an information parameter, and the UE determines the value of x based on the information parameter. For a determination method, refer to chapter 6 of the protocol 3GPP TS 38.214.

S240: The man-in-the-middle sends the first SR to the base station.

After receiving the first SR sent by the UE in step S210, the man-in-the-middle reports the first SR to the real base station through the false UE.

S250: The base station sends second DCI to the man-in-the-middle.

After receiving the first SR sent by the false UE, the base station sends the second DCI to the man-in-the-middle to indicate an appropriate available resource for the false UE.

S260: The man-in-the-middle sends the first RRC message to the base station.

The man-in-the-middle receives the second DCI sent by the base station, determines a physical frame b based on the second DCI, and sends the first RRC message to the base station in the physical frame b.

In some embodiments, the physical frame a is a time domain resource location indicated by the man-in-the-middle for the UE, and the physical frame b is a time domain resource location indicated by the base station for the man-in-the-middle. Because the man-in-the-middle is unable to predict a location of the physical frame b indicated by the base station, the physical frame a is unable to match the physical frame b. Therefore, in response to the man-in-the-middle attack existing, the physical frame in which the UE sends the uplink message is unable to match the physical frame in which the base station receives the uplink message.

Figure 5:
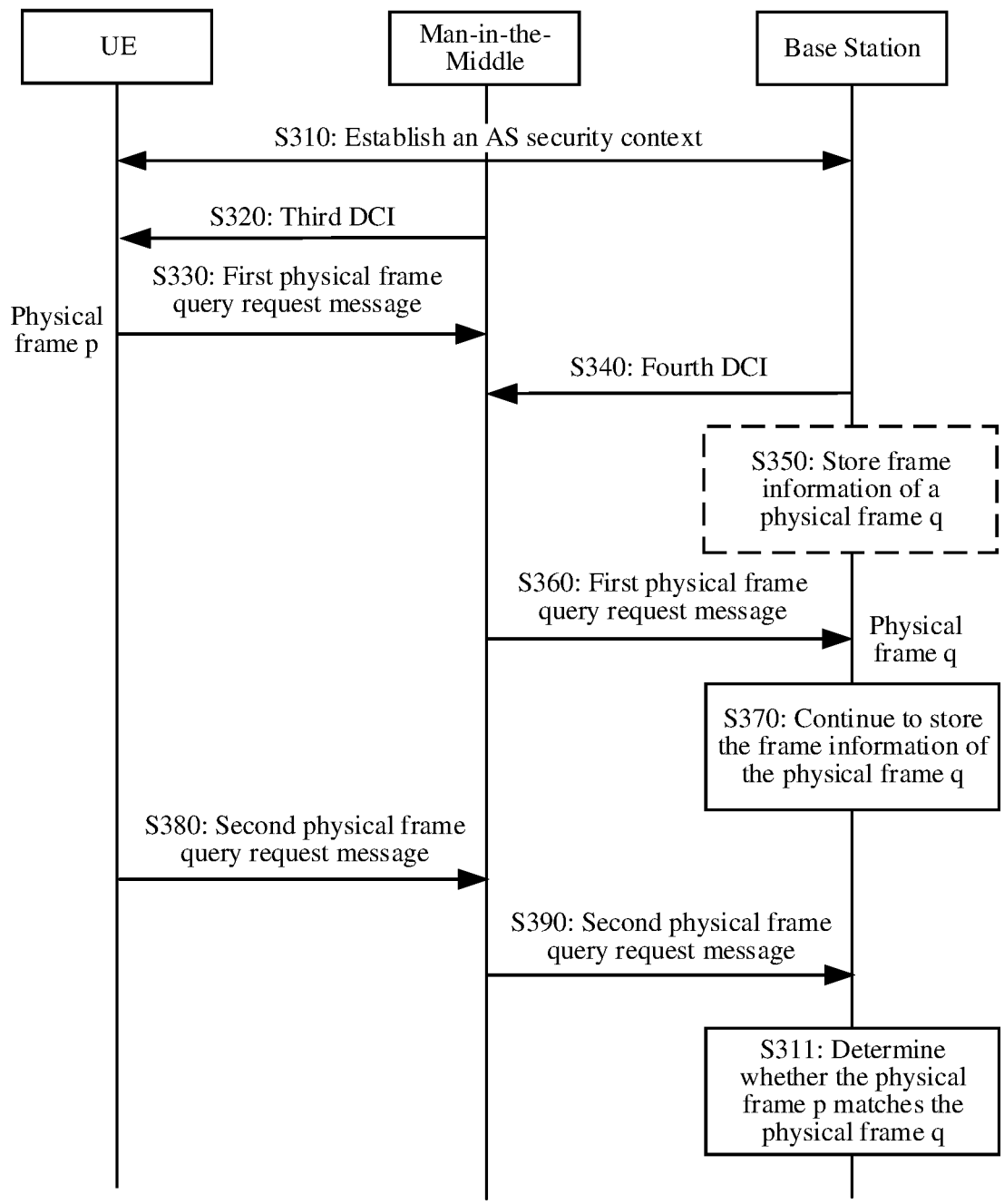
FIG. 5 is a schematic interaction diagram of another example of a man-in-the-middle detection method according to some embodiments.

FIG. 5 is a schematic flowchart of a man-in-the-middle detection method 300 according to some embodiments in response to a man-in-the-middle attack existing between UE and a base station. From FIG. 5 the method 300 includes the following steps.

S310: The UE establishes an AS security context with the base station.

The UE accesses the base station, that is, the UE establishes an indirect connection to the base station through the man-in-the-middle, and then the UE establishes the access stratum AS security context with the base station. In some embodiments, after the UE establishes the AS security context with the base station, security protection is performed on RRC messages, and the man-in-the-middle is unable to tamper with the RRC message sent between the UE and the base station. In some embodiments, the security protection includes RRC integrity protection and RRC confidentiality protection. The RRC integrity protection ensures that the RRC message is not tampered with in a transmission process, and the RRC confidentiality protection ensures that information content of the RRC message is not disclosed in the transmission process.

S320: The man-in-the-middle sends third DCI to the UE, where the third DCI is used to determine a physical frame p for sending the RRC message by the UE.

In some embodiments, before S320, the UE sends a buffer status report (buffer status report, BSR) to the man-in-the-middle to indicate a data volume of an uplink buffer, and then the man-in-the-middle sends the third DCI to the UE to allocate an appropriate available resource to the UE. The UE determines the physical frame p based on the third DCI. For example, in an NR system, the UE receives the third DCI in a physical frame c, a frame number and a subframe number of the physical frame c are 10 and 6 respectively, and time indicated by the physical frame c is 10*10+6=106. The third DCI carries an information parameter. The UE obtains, through calculation based on the information parameter, that a value of x is 2, and time indicated by a physical frame e is 106+2=108. Therefore, a frame number and a subframe number of the physical frame e are 10 and 8 respectively.

Optionally, after determining the physical frame p based on the third DCI, the UE stores frame information of the physical frame p, where the frame information of the physical frame p includes a frame number and a subframe number of the physical frame p.

In some embodiments, before step S320, in response to a first preset rule being met, the UE enables man-in-the-middle detection. The enabling man-in-the-middle detection means that the UE performs the method mentioned in some embodiments. For example, the enabling man-in-the-middle detection includes: The UE sends a first physical frame query request message and a second physical frame query request message that carries the frame information of the physical frame p.

The first preset rule includes: The UE receives indication information from the base station, where the indication information indicates the UE to enable man-in-the-middle detection; or the UE determines that user plane integrity protection between the UE and the base station is not enabled. In some embodiments, in response to the user plane integrity protection not being enabled, there is a risk of tampering with user plane data between the UE and the base station. In this case, in response to the man-in-the-middle existing, authenticity of the user plane data is unable to be ensured. Therefore, the man-in-the-middle detection is enabled.

Optionally, in response to a second preset rule being met, the base station sends indication information to the UE to indicate the UE to enable the man-in-the-middle detection. The second preset rule is, for example, that a key performance indicator (key performance indicator, KPI) is greater than a second threshold.

S330: The UE sends the first physical frame query request message to the man-in-the-middle.

The UE sends, in the physical frame p, the first physical frame query request message that is carried in the RRC message, to perform man-in-the-middle detection. Security protection is performed on the message, and therefore the message is unable to be tampered with by the man-in-the-middle.

In some embodiments, the first physical frame query request message is an empty RRC message.

S340: The base station sends fourth DCI to the man-in-the-middle, where the fourth DCI is used to determine a physical frame q.

In some embodiments, before S340, the man-in-the-middle sends the BSR to the base station through false UE, to indicate the data volume of the uplink buffer, and then the base station sends the fourth DCI to the man-in-the-middle, where the fourth DCI is used to determine the physical frame q.

S350: The base station stores frame information of the physical frame q.

Optionally, after indicating the physical frame q to the man-in-the-middle by using the fourth DCI, the base station stores the frame information of the physical frame q.

S360: The man-in-the-middle sends the first physical frame query request message to the base station.

The man-in-the-middle receives, in the physical frame p, the first physical frame query request message sent by the UE. Security protection is performed on the first physical frame query request message by using the AS security context established by the UE and the base station, and therefore the man-in-the-middle is unable to tamper with the first physical frame query request message, and is transparently transmitted to the base station. Therefore, the man-in-the-middle sends, in the physical frame q indicated by the base station for the man-in-the-middle, the first physical frame query request message to the base station.

S370: The base station continues to store the frame information of the physical frame q.

After receiving, in the physical frame q, the first physical frame query request message forwarded by the man-in-the-middle, the base station locally records the frame information of the physical frame q, where the frame information of the physical frame q includes a frame number and a subframe number of the physical frame q.

Optionally, in response to the first physical frame query request message including indication information, for example, the first physical frame query request message is an RRC message for enabling the man-in-the-middle detection, or the first RRC message includes indication information (for example, an indication bit is carried in an existing measurement report, and the indication bit optionally indicates to enable the man-in-the-middle detection), the base station continues to retain the frame information of the physical frame q or restores the frame information of the physical frame q.

Optionally, the base station determines, based on the first RRC message, that a terminal enables the man-in-the-middle detection.

In some embodiments, a feature that the base station continues to retain the frame information of the physical frame q is applied to another embodiment in which information about a physical frame is retained. This is not limited in some embodiments.

Optionally, in an NR system, the frame information of the physical frame q further includes a slot number of the physical frame q. In the NR system, in response to a subframe including a plurality of slots, the base station (or false base station) indicates, to the UE by using DCI, the frame number, the subframe number, and the slot number of the physical frame q.

S380: The UE sends the second physical frame query request message to the man-in-the-middle.

After sending, in the physical frame p, the first physical frame query request message to the man-in-the-middle, the UE sends the second physical frame query request message on which security protection is performed to the man-in-the-middle, where the second physical frame query request message includes the frame information of the physical frame p. In some embodiments, after determining to enable the man-in-the-middle detection, the UE includes the frame information of the physical frame p in the second physical frame query request message for the man-in-the-middle detection. In some embodiments, the second RRC message is sent to perform a man-in-the-middle detection procedure, so that the base station determines, based on the information about the physical frame carried in the second physical frame query request message, whether the man-in-the-middle exists.

In some embodiments, because the first physical frame query request message is an RRC layer message, in response to the message being encoded and constructed at an RRC layer, a physical frame in which the message is sent is unable to be determined. After the first physical frame query request message is encoded, the first physical frame query request message enters a buffer queue. The UE reports the buffer status report to the base station. Then, the base station schedules the UE in a unified manner. After obtaining a resource, the UE uses the resource for message sending. There is a possibility of retransmission in message sending, and that current sending is definitely successful during sending is unable to be ensured. Therefore, the first physical frame query request message is unable to carry the frame information of the physical frame p.

S390: The man-in-the-middle sends the second physical frame query request message to the base station.

The man-in-the-middle receives the second physical frame query request message sent by the UE. However, because the second physical frame query request message is sent by the UE based on the AS security context, the man-in-the-middle is unable to crack or tamper with the second physical frame query request message, and transparently transmits the second physical frame query request message to the base station.

S311: The base station determines whether the physical frame p matches the physical frame q.

After receiving the second physical frame request message transparently transmitted by the man-in-the-middle, the base station extracts the frame number and the subframe number of the physical frame p that are carried in the second physical frame query request message, and compares the frame number and the subframe number with the frame number and the subframe number of the physical frame q that are locally recorded and stored. In response to the frame number of the physical frame p being the same as the frame number of the physical frame q and the subframe number of the physical frame p is the same as the subframe number of the physical frame q, the physical frame p matches the physical frame q, and no man-in-the-middle exists between the UE and the base station. Otherwise, the physical frame p does not match the physical frame q, and the man-in-the-middle exists between the UE and the base station.

Optionally, in the NR system, in response to a slot number of a physical frame being considered, the second physical frame query request message carries the frame number, the subframe number, and a slot number of the physical frame p, and compares the frame number, the subframe number, and the slot number with the frame number, the subframe number, and the slot number of the physical frame q that are locally recorded. In response to the frame number, the subframe number, and the slot number of the physical frame p being respectively the same as the frame number, the subframe number, and the slot number of the physical frame q, the physical frame p matches the physical frame q, and no man-in-the-middle exists between the UE and the base station. Otherwise, the physical frame p does not match the physical frame q, and the man-in-the-middle exists between the UE and the base station.

Optionally, after determining that the man-in-the-middle exists, the base station issues a warning or take a preventive measure.

Therefore, according to the man-in-the-middle detection method in some embodiments, man-in-the-middle detection is performed based on that a physical frame in which the man-in-the-middle sends an uplink message through the false UE is unable to be consistent with a physical frame in which real UE sends the uplink message, to prevent the man-in-the-middle from bypassing detection through a mechanism of the man-in-the-middle and improve a man-in-the-middle detection rate.

Figure 6:
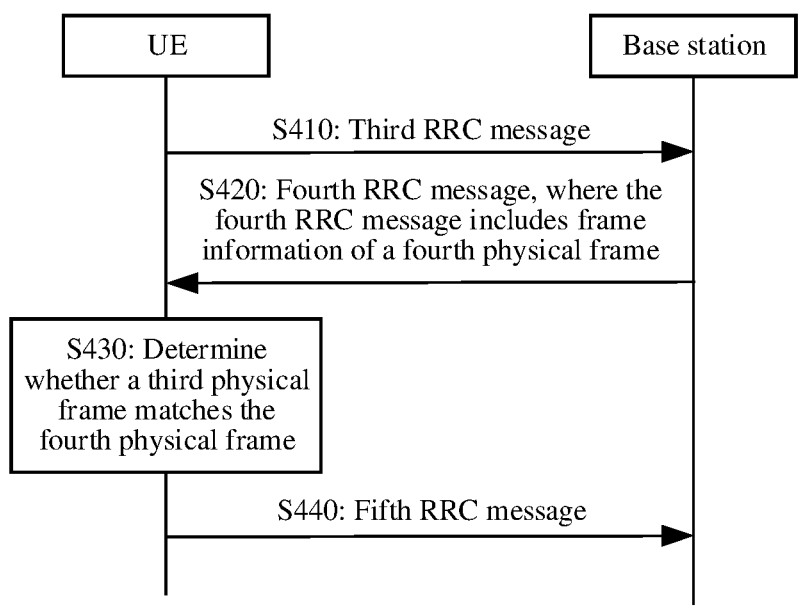
FIG. 6 is a schematic interaction diagram of another example of a man-in-the-middle detection method according to some embodiments.

FIG. 6 is a schematic flowchart of another man-in-the-middle detection method 400 according to some embodiments. From FIG. 6 method 400 includes the following steps.

S410: UE sends, in a third physical frame, a third RRC message to a base station.

S420: The UE receives a fourth RRC message sent by the base station, where the fourth RRC message includes frame information of a fourth physical frame.

S430: The UE determines whether the third physical frame matches the fourth physical frame.

S440: The UE sends a fifth RRC message to the base station, where the fifth RRC message indicates whether the third physical frame matches the fourth physical frame.

After successfully establishing an AS security context with the base station, the UE sends, in the third physical frame, the third RRC message on which security protection is performed to the base station, where the third physical frame is a time domain resource specified by the base station (or false base station) for the UE. Security protection is performed on the third RRC message by using the access stratum AS security context established by the UE and the base station. Therefore, a man-in-the-middle is unable to crack or tamper with the third RRC message. In response to a man-in-the-middle attack existing, air interface communication between the UE and the base station is intercepted by the man-in-the-middle. An air interface between the UE and the false base station and an air interface between false UE and the base station are independent of each other, that is, the base station is unable to directly receive the third RRC message sent by the UE. The man-in-the-middle receives the third RRC message through the false base station and forwards the third RRC message to the base station through the false UE. The base station receives, in the fourth physical frame, the third RRC message, and sends the fourth RRC message on which security protection is performed to the UE, where the fourth RRC message includes the frame information of the fourth physical frame. The UE receives the fourth RRC message, obtains the frame information of the fourth physical frame by using the fourth RRC message, and determines whether the third physical frame matches the fourth physical frame. After the man-in-the-middle attack occurs between the UE and the base station, a physical frame in which the UE sends an uplink message is unable to be consistent with a physical frame in which the base station receives the uplink message. Therefore, in response to the third physical frame matching the fourth physical frame, the UE determines that no man-in-the-middle exists between the UE and the base station. In response to the third physical frame not matching the fourth physical frame, the UE determines that the man-in-the-middle exists between the UE and the base station. Then, the UE sends a fifth RRC message to the base station, where the fifth RRC message indicates whether the third physical frame matches the fourth physical frame.

Therefore, according to the man-in-the-middle detection method in some embodiments, whether the man-in-the-middle exists in the air interface communication is determined by determining whether the physical frame in which the UE sends the uplink message matches the physical frame in which the base station receives the uplink message, to prevent the man-in-the-middle from bypassing detection through a mechanism of the man-in-the-middle and improve a man-in-the-middle detection rate.

Figure 7:
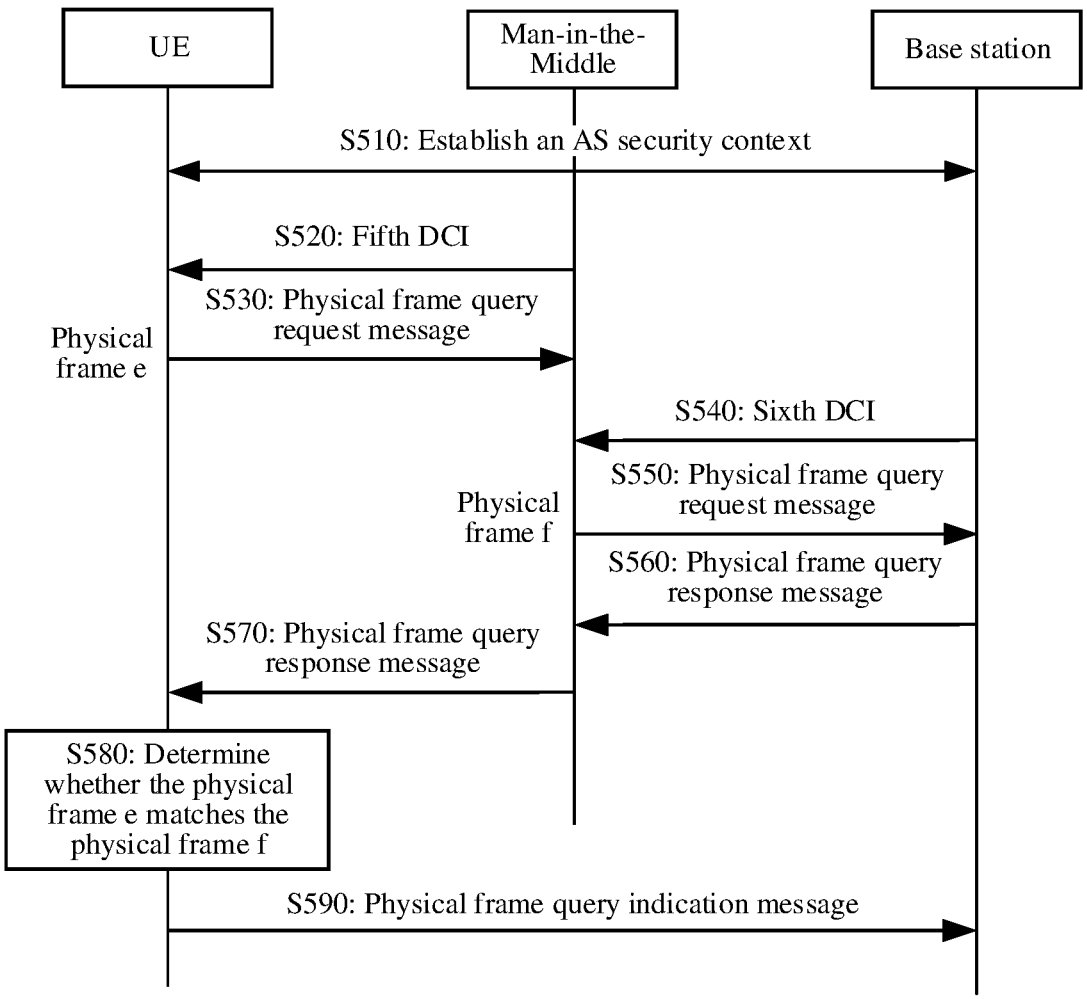
FIG. 7 is a schematic interaction diagram of another example of a man-in-the-middle detection method according to some embodiments.

FIG. 7 shows a schematic flowchart of a man-in-the-middle detection method 500 according to some embodiments in response to a man-in-the-middle attack existing between UE and a base station. From FIG. 7 method 500 includes the following steps.

S510: The UE establishes an AS security context with the base station.

The UE accesses the base station, that is, the UE establishes an indirect connection to the base station through the man-in-the-middle, and then the UE establishes the access stratum AS security context with the base station. In some embodiments, after the UE establishes the AS security context with the base station, security protection is performed on RRC messages, and the man-in-the-middle is unable to tamper with the RRC message sent between the UE and the base station.

S520: The man-in-the-middle sends fifth DCI to the UE, where the fifth DCI is used to determine a physical frame in which the UE sends an RRC message.

In some embodiments, before S520, the UE sends a buffer status report (buffer status report, BSR) to the man-in-the-middle to indicate a data volume of an uplink buffer, and then the man-in-the-middle sends the fifth DCI to the UE to allocate an appropriate available resource to the UE. The UE determines a physical frame e based on the fifth DCI.

Optionally, the UE locally records frame information of the physical frame e, where the frame information of the physical frame e includes a frame number and a subframe number of the physical frame e.

In some embodiments, before step S520, in response to a first preset rule being met, the UE enables man-in-the-middle detection. The enabling man-in-the-middle detection means that the UE performs the method mentioned in some embodiments. For example, the enabling man-in-the-middle includes: The UE sends a physical frame query request message and stores the frame information of the physical frame e.

The first preset rule includes: The UE receives indication information from the base station, where the indication information indicates the UE to enable man-in-the-middle detection; or the UE determines that user plane integrity protection between the UE and the base station is not enabled.

Optionally, in response to a second preset rule being met, the base station sends indication information to the UE to indicate the UE to enable the man-in-the-middle detection. The second preset rule is, for example, that a key performance indicator (key performance indicator, KPI) is greater than a second threshold.

S530: The UE sends the physical frame query request message to the man-in-the-middle.

The UE sends, in the physical frame e, the physical frame query request message that is carried in the RRC message, to perform man-in-the-middle detection. Security protection is performed on the message by using the access stratum AS security context established between the UE and the base station, and therefore the message is unable to be tampered with by the man-in-the-middle.

In some embodiments, the physical frame query request message is an empty RRC message.

S540: The base station sends sixth DCI to the man-in-the-middle, where the sixth DCI is used to determine a physical frame for the man-in-the-middle to perform RRC communication.

Optionally, before S540, the man-in-the-middle sends the buffer status report (buffer status report, BSR) to the base station to indicate the data volume of an uplink buffer. Then, the man-in-the-middle sends the fifth DCI to the UE to allocate an appropriate available resource to the UE. The UE determines a physical frame f based on the sixth DCI.

S550: The man-in-the-middle sends the physical frame query request message to the base station.

In S530, the man-in-the-middle receives the physical frame query request message sent by the UE. Because security protection is performed on the message, the man-in-the-middle is unable to tamper with the message. Therefore, the man-in-the-middle forwards, in the physical frame f indicated by the base station to the man-in-the-middle, the physical frame query request message to the base station.

S560: The base station sends a physical frame query response message to the man-in-the-middle.

After receiving, in the physical frame f, the physical frame query request message transparently transmitted by the man-in-the-middle, the base station sends the physical frame query response message on which security protection is performed to the false UE. The physical frame query response message carries frame information of the physical frame f, where the frame information of the physical frame f includes a frame number and a subframe number of the physical frame f.

S570: The man-in-the-middle sends the physical frame query response message to the UE.

After receiving the physical frame query response message sent by the base station, the man-in-the-middle forwards the physical frame query response message to the UE through the false base station.

S580: The UE determines whether the physical frame e matches the physical frame f.

After receiving the physical frame query response message sent by the false base station, the UE extracts the frame number and the subframe number of the physical frame f that are carried in the physical frame query response message, and compare the frame number and the subframe number with the frame number and the subframe number of the physical frame e that are locally recorded and stored in response to the physical frame query request message being successfully sent. In response to the frame number of the physical frame e being the same as the frame number of the physical frame f and the subframe number of the physical frame e is the same as the subframe number of the physical frame f, the physical frame e matches the physical frame f, and no man-in-the-middle exists between the UE and the base station. Otherwise, the physical frame e does not match the physical frame f, and the man-in-the-middle exists between the UE and the base station.

S590: The UE sends a physical frame query indication message to the base station.

After determining whether the physical frame e matches the physical frame f, the UE sends the physical frame query indication message on which security protection is performed to the base station, and the physical frame query indication message is received by the base station after being transparently transmitted by the man-in-the-middle. The physical frame query indication message includes a determining result, where the determining result indicates whether the physical frame e matches the physical frame f. After determining, based on the physical frame query indication message, that the man-in-the-middle exists, the base station issues a warning or take a preventive measure.

Therefore, according to the man-in-the-middle detection method in some embodiments, man-in-the-middle detection is performed based on that a physical frame in which the man-in-the-middle sends an uplink message through the false UE is unable to be consistent with a physical frame in which real UE sends the uplink message, to prevent the man-in-the-middle from bypassing detection through a mechanism of the man-in-the-middle and improve a man-in-the-middle detection rate.

The methods provided in some embodiments are described above in detail with reference to FIG. 3 to FIG. 7. The following describes in detail communication apparatuses provided in some embodiments with reference to FIG. 8 and FIG. 12.

Figure 8:
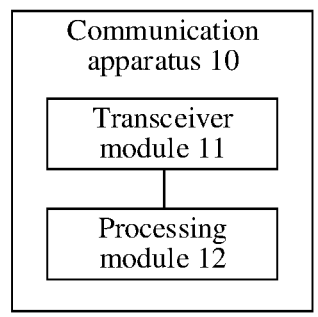
FIG. 8 is a schematic block diagram of an example of user equipment according to some embodiments.

FIG. 8 is a schematic block diagram of a communication apparatus according to some embodiments. As shown in the figure, the communication apparatus 10 includes a transceiver module 11 and a processing module 12.

In a possible design, the communication apparatus 10 corresponds to the base station in the foregoing method embodiments.

The communication apparatus 10 corresponds to the user equipment in the method 100, the method 200, and the method 300 according to some embodiments. The communication apparatus 10 includes a module configured to perform a method performed by the base station in the method 100 in FIG. 3, the method 200 in FIG. 4, or the method 300 in FIG. 5. In addition, units in the communication apparatus 10 and the foregoing other operations and/or functions are separately intended to implement corresponding procedures of the method 100 in FIG. 3, the method 200 in FIG. 4, or the method 300 in FIG. 5.

In response to the communication apparatus 10 being configured to perform the method 100 in FIG. 3, the transceiver module 11 is configured to perform step S110 and step S120 in the method 100, and the processing module 12 is configured to perform step S130 in the method 100.

Figure 4:
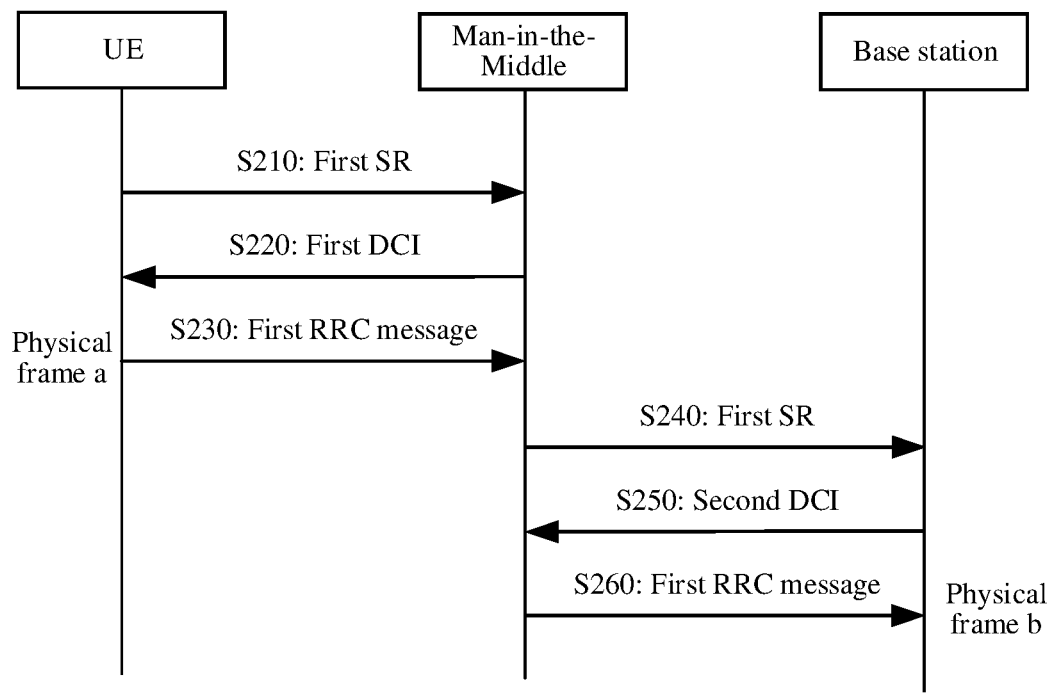
FIG. 4 is a schematic diagram of message transmission between user equipment and a base station according to some embodiments.

In response to the communication apparatus 10 being configured to perform the method 200 in FIG. 4, the transceiver module 11 is configured to perform step S240, step S250, and step S260 in the method 200.

In response to the communication apparatus 10 being configured to perform the method 300 in FIG. 5, the transceiver module 11 is configured to perform step S340, step S350, and step S380 in the method 300, and the processing module 12 is configured to perform step S360 and S390 in the method 300.

The transceiver module 11 is configured to receive, in a first physical frame, a first radio resource control RRC message from user equipment UE. The transceiver module is further configured to receive a second RRC message from the UE, where the second RRC message includes frame information of a second physical frame, and security protection is performed on the first RRC message and the second RRC message by using an access stratum AS security context established by the UE and a base station. The processing module is configured to determine whether the first physical frame matches the second physical frame.

Optionally, the processing module 12 is configured to: in response to a frame number of the first physical frame being the same as a frame number of the second physical frame and a subframe number of the first physical frame is the same as a subframe number of the second physical frame, determine, by the base station, that the first physical frame matches the second physical frame; otherwise, determine, by the base station, that the first physical frame does not match the second physical frame.

Optionally, the processing module 12 is further configured to store frame information of a third physical frame.

Optionally, the processing module 12 is further configured to establish the AS security context with the UE.

Optionally, the transceiver module 11 is further configured to send indication information to the UE, where the indication information indicates the UE to send a fourth RRC message to the base station.

Figure 9:
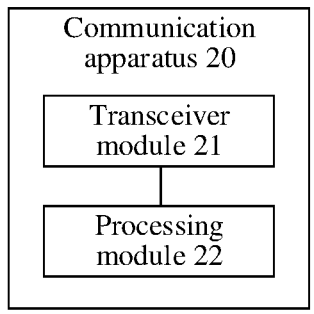
FIG. 9 is a schematic block diagram of an example of a base station according to some embodiments.

FIG. 9 is a schematic block diagram of a communication apparatus according to some embodiments. As shown in the figure, the communication apparatus 20 includes a transceiver module 21 and a processing module 22.

In a possible design, the communication apparatus 20 corresponds to the user equipment UE in the foregoing method embodiments or a chip disposed in the UE.

The communication apparatus 20 corresponds to the base station in the method 100, the method 200, and the method 300 according to some embodiments. The communication apparatus 20 includes a module configured to perform a method performed by the user equipment in the method 100 in FIG. 3, the method 200 in FIG. 4, or the method 300 in FIG. 5. In addition, units in the communication apparatus 20 and the foregoing other operations and/or functions are separately intended to implement corresponding procedures of the method 100 in FIG. 3, the method 200 in FIG. 4, or the method 300 in FIG. 5.

In response to the communication apparatus 20 being configured to perform the method 100 in FIG. 3, the transceiver module 11 is configured to perform step S110 and step S120 in the method 100.

In response to the communication apparatus 20 being configured to perform the method 200 in FIG. 4, the transceiver module 11 is configured to perform step S210, step S220, and step S230 in the method 200.

In response to the communication apparatus 20 being configured to perform the method 300 in FIG. 5, the transceiver module 11 is configured to perform step S320, step S330, and step S370 in the method 300.

The transceiver module 21 is configured to send, in a second physical frame, a first radio resource control RRC message to a base station. The transceiver module is further configured to send a second RRC message to the base station, where the second RRC message includes frame information of the second physical frame, and security protection is performed on the first RRC message and the second RRC message by using an access stratum AS security context established by UE and the base station.

Optionally, the transceiver module 21 is further configured to receive downlink control information DCI, where the DCI is used to determine the frame information of the second physical frame.

Optionally, the processing module 22 is configured to store the frame information of the second physical frame.

Optionally, the processing module 22 is further configured to access the base station and establish the AS security context with the base station.

Optionally, the transceiver module 21 is configured to: in response to a preset rule being met, send, by the UE in the second physical frame, the first RRC message to the base station.

Optionally, the processing module 22 is further configured to receive indication information sent by the base station, where the indication information indicates the UE to enable man-in-the-middle detection, or determine that user plane integrity protection the base station is not enabled.

Figure 10:
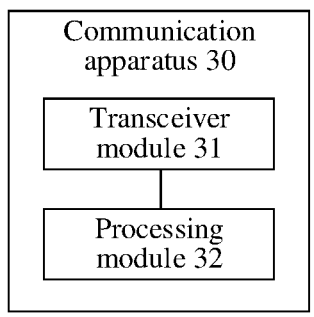
FIG. 10 is a schematic block diagram of another example of user equipment according to some embodiments.

FIG. 10 is a schematic block diagram of a communication apparatus according to some embodiments. As shown in the figure, the communication apparatus 30 includes a transceiver module 31 and a processing module 32.

In a possible design, the communication apparatus 30 corresponds to the user equipment UE in the foregoing method embodiments.

The communication apparatus 30 corresponds to the base station in the method 400 and the method 500 according to some embodiments. The communication apparatus 30 includes a module configured to perform a method performed by the UE in the method 400 in FIG. 6 or the method 500 in FIG. 7. In addition, units in the communication apparatus 30 and the foregoing other operations and/or functions are separately intended to implement corresponding procedures of the method 400 in FIG. 6 or the method 500 in FIG. 7.

In response to the communication apparatus 30 being configured to perform the method 400 in FIG. 6, the transceiver module 41 is configured to perform step S410 and step S420 in the method 400, and the processing module 42 is configured to perform step S430 in the method 400.

In response to the communication apparatus 30 being configured to perform the method 500 in FIG. 7, the transceiver module 41 is configured to perform step S520, step S530, step S570, step S590 in the method 500, and the processing module 42 is configured to perform step S580 in the method 500.

The transceiver module 31 is configured to send, in a third physical frame, a third radio resource control RRC message to a base station. The transceiver module is further configured to receive a fourth RRC message from the base station, where the fourth RRC message includes frame information of a fourth physical frame. The transceiver module is further configured to send a fifth RRC message to the base station, where the fifth RRC message indicates whether the third physical frame matches the fourth physical frame, and security protection is performed on the third RRC message, the fourth RRC message, and the fifth RRC message by using an access stratum AS security context established by UE and the base station.

Optionally, the processing module 32 is configured to: in response to a frame number of the third physical frame being the same as a frame number of the fourth physical frame and a subframe number of the third physical frame is the same as a subframe number of the fourth physical frame, determine, by the UE, that the third physical frame matches the fourth physical frame; otherwise, determine, by the UE, that the third physical frame does not match the fourth physical frame.

Optionally, the transceiver module 31 is further configured to receive downlink control information DCI, where the DCI is used to determine frame information of the third physical frame, and the frame information of the third physical frame includes the frame number and the subframe number of the third physical frame.

Optionally, the processing module 32 is further configured to store the frame information of the third physical frame.

Optionally, the processing module 32 is further configured to access the base station and establish the AS security context with the base station.

Figure 11:
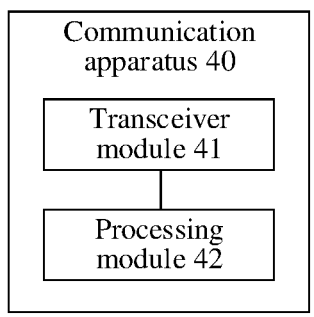
FIG. 11 is a schematic block diagram of another example of a base station according to some embodiments.

FIG. 11 is a schematic block diagram of a communication apparatus according to some embodiments. As shown in the figure, the communication apparatus 30 includes a transceiver module 41 and a processing module 42.

In a possible design, the communication apparatus 40 corresponds to the base station in the foregoing method embodiments.

The communication apparatus 40 corresponds to the base station in the method 400 and the method 500 according to some embodiments. The communication apparatus 40 includes a module configured to perform a method performed by the base station in the method 400 in FIG. 6 or the method 500 in FIG. 7. In addition, units in the communication apparatus 30 and the foregoing other operations and/or functions are separately intended to implement corresponding procedures of the method 400 in FIG. 6 or the method 500 in FIG. 7.

In response to the communication apparatus 40 being configured to perform the method 400 in FIG. 6, the transceiver module 41 is configured to perform step S410, step S420, and step S440 in the method 400.

In response to the communication apparatus 40 being configured to perform the method 500 in FIG. 7, the transceiver module 41 is configured to perform step S540, step S550, step S560, step S590 in the method 500, and the processing module 42 is configured to perform step S510 in the method 500.

The transceiver module 41 is configured to receive, in a fourth physical frame, a third RRC message from user equipment UE. The transceiver module is further configured to send a fourth RRC message to the UE, where the fourth RRC message includes frame information of the fourth physical frame. The transceiver module is further configured to receive a fifth RRC message sent by the UE. The processing module is configured to determine, based on the fifth RRC message, whether a man-in-the-middle exists between a base station and the UE.

Optionally, the processing module 42 is configured to: in response to a third physical frame not matching the fourth physical frame, determine that the man-in-the-middle exists between the base station and the UE; or in response to the third physical frame matching the fourth physical frame, determine that no man-in-the-middle exists between the base station and the UE.

Optionally, the processing module 42 is further configured to establish an AS security context with the UE.

Optionally, the transceiver module 41 is further configured to send indication information to the UE, where the indication information indicates the UE to enable man-in-the-middle detection.

Figure 12:
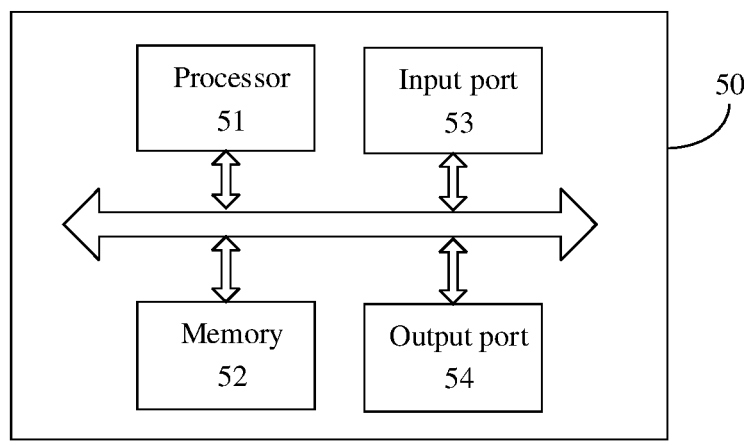
FIG. 12 is a schematic block diagram of an example of a communication apparatus according to some embodiments.

According to the foregoing methods, FIG. 12 is a schematic diagram of a communication apparatus 50 according to some embodiments. As shown in FIG. 12, the apparatus 50 is a device that detects a man-in-the-middle and includes various handheld devices, in-vehicle devices, wearable devices, calculating devices that have a wireless communication function, or other processing devices connected to a wireless modem, and various forms of terminals, mobile stations (Mobile Stations, MSs), terminals (Terminals), user equipment UEs, soft terminals, and the like.

The apparatus 50 includes a processor 51 (that is, an example of a processing module) and a memory 52. The memory 52 is configured to store instructions. The processor 51 is configured to execute the instructions stored in the memory 52, to enable the apparatus 30 to implement a step performed by a network registration device in the method corresponding to FIG. 3, FIG. 4, FIG. 5, FIG. 6, or FIG. 7.

Further, the apparatus 50 further includes an input port 53 (that is, an example of a transceiver module) and an output port 54 (that is, another example of a transceiver module). Further, the processor 51, the memory 52, the input port 53, and the output port 54 communicates with each other through an internal connection path, to transmit a control signal and/or a data signal. The memory 32 is configured to store a computer program. The processor 51 is configured to invoke the computer program from the memory 52 and run the computer program, to control the input port 53 to receive a signal, and control the output port 54 to send a signal, so as to complete a step performed by the terminal device in the foregoing methods. The memory 52 is integrated into the processor 51, or is disposed separately from the processor 51.

Optionally, in response to the communication apparatus 50 being a communication device, the input port 53 is a receiver, and the output port 54 is a transmitter. The receiver and the transmitter is a same physical entity or different physical entities. In response to the receiver and the transmitter being a same physical entity, the receiver and the transmitter is collectively referred to as a transceiver.

Optionally, in response to the communication apparatus 50 being a chip or a circuit, the input port 53 is an input interface, and the output port 54 is an output interface.

In some embodiments, functions of the input port 53 and the output port 54 are implemented by using a transceiver circuit or a dedicated transceiver chip. In some embodiments, the processor 51 is implemented by using a dedicated processing chip, a processing circuit, a processor, or a general-purpose chip.

In some embodiments, the communication device provided in some embodiments is implemented by using a general-purpose computer. Program code for implementing functions of the processor 51, the input port 53, and the output port 54 is stored in the memory 52. The general-purpose processor implements the functions of the processor 51, the input port 53, and the output port 54 by executing the code in the memory 52.

Modules or units in the communication apparatus 50 is configured to perform actions or processing processes performed by a device (for example, user equipment) for man-in-the-middle detection in the foregoing methods. To avoid repetition, detailed descriptions thereof are omitted herein.

For concepts, explanations, detailed descriptions, and other steps of the apparatus 50 that are related to the technical solutions provided in some embodiments, refer to the descriptions related to the content in the foregoing methods or another embodiment. Details are not described herein again.

Figure 13:
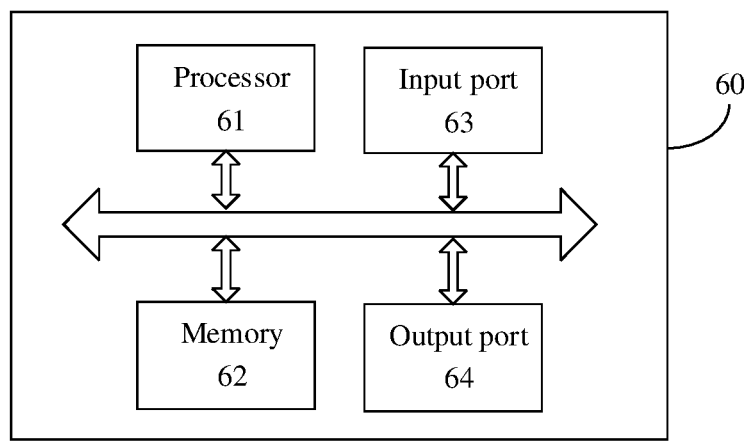
FIG. 13 is a schematic block diagram of another example of a communication apparatus according to some embodiments.

According to the foregoing methods, FIG. 13 is a schematic diagram of a communication apparatus 60 according to some embodiments. As shown in FIG. 10, the apparatus 60 is a man-in-the-middle detection device, and includes a network element having an access management function, for example, an AMF.

The apparatus 60 includes a processor 61 (that is, an example of a processing module) and a memory 62. The memory 62 is configured to store instructions. The processor 61 is configured to execute the instructions stored in the memory 62, to enable the apparatus 60 to implement a step performed by a device for man-in-the-middle detection in the method corresponding to FIG. 3, FIG. 4, FIG. 5, FIG. 6, or FIG. 7.

Further, the apparatus 60 further includes an input port 63 (that is, an example of a transceiver module) and an output port 64 (that is, another example of a transceiver module). Further, the processor 61, the memory 62, the input port 63, and the output port 64 communicates with each other through an internal connection path, to transmit a control signal and/or a data signal. The memory 62 is configured to store a computer program. The processor 61 is configured to invoke the computer program from the memory 62 and run the computer program, to control the input port 63 to receive a signal, and control the output port 64 to send a signal, so as to complete a step performed by the terminal device in the foregoing methods. The memory 62 is integrated into the processor 61, or is disposed separately from the processor 61.

Optionally, in response to the communication apparatus 60 being a communication device, the input port 63 is a receiver, and the output port 64 is a transmitter. The receiver and the transmitter is a same physical entity or different physical entities. In response to the receiver and the transmitter being the same physical entity, the receiver and the transmitter is collectively referred to as a transceiver.

Optionally, in response to the communication apparatus 60 being a chip or a circuit, the input port 63 is an input interface, and the output port 44 is an output interface.

In some embodiments, functions of the input port 63 and the output port 64 are implemented by using a transceiver circuit or a dedicated transceiver chip. In some embodiments, the processor 61 is implemented by using a dedicated processing chip, a processing circuit, a processor, or a general-purpose chip.

In some embodiments, the communication device provided in some embodiments is implemented by using a general-purpose computer. Program code for implementing functions of the processor 61, the input port 63, and the output port 64 is stored in the memory 62. The general-purpose processor implements the functions of the processor 61, the input port 63, and the output port 64 by executing the code in the memory 62.

Modules or units in the communication apparatus 60 is configured to perform actions or processing processes performed by a network-side device (that is, a network device) during network registration in the foregoing methods. To avoid repetition, detailed descriptions thereof are omitted herein.

For concepts, explanations, detailed descriptions, and other steps of the apparatus 60 that are related to the technical solutions provided in some embodiments, refer to the descriptions related to the content in the foregoing methods or another embodiment. Details are not described herein again.

Figure 14:
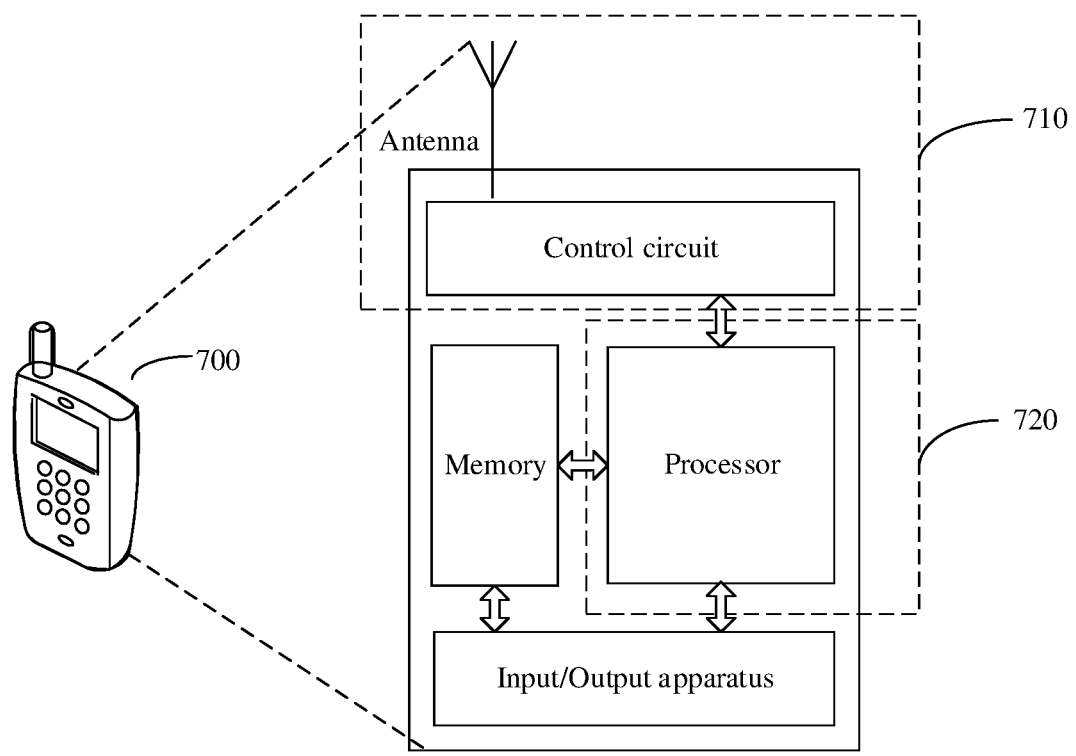
FIG. 14 is a schematic diagram of a structure of a terminal device according to some embodiments.

FIG. 14 is a schematic diagram of a structure of a terminal device 500 according to some embodiments. For ease of description, FIG. 14 shows main components of the terminal device. As shown in FIG. 14, the terminal device 500 includes a processor, a memory, a control circuit, an antenna, and an input/output apparatus.

The processor is mainly configured to process a communication protocol and communication data, control the entire terminal device, execute a software program, and process data of the software program, for example, is configured to support the terminal device in performing actions described in the foregoing embodiments of an indication method for transmitting a precoding matrix. The memory is mainly configured to store a software program and data, for example, store a codebook described in the foregoing embodiments. The control circuit is mainly configured to convert a baseband signal and a radio frequency signal, and process the radio frequency signal. The control circuit and the antenna together further is referred to as a transceiver, and are mainly configured to receive and send a radio frequency signal in a form of an electromagnetic wave. The input/output apparatus, such as a touchscreen, a display, or a keyboard, is mainly configured to receive data entered by a user and output data to the user.

After the terminal device is powered on, the processor reads a software program in a storage unit, interpret and execute instructions of the software program, and process data of the software program. In response to data being sent wirelessly, the processor performs baseband processing on to-be-sent data, and then outputs a baseband signal to a radio frequency circuit. The radio frequency circuit performs radio frequency processing on the baseband signal, and then sends, through the antenna, a radio frequency signal in a form of an electromagnetic wave. In response to data being sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art is able to understand that, for ease of description, FIG. 14 shows one memory and one processor. In an terminal device, there is a plurality of processors and memories. The memory further is referred to as a storage medium, a storage device, or the like. This is not limited in some embodiments.

In an optional implementation, the processor includes a baseband processor and a central processing unit. The baseband processor is mainly configured to process a communication protocol and communication data. The central processing unit is mainly configured to control the entire terminal device, execute a software program, and process data of the software program. The processor in FIG. 14 integrates functions of the baseband processor and the central processing unit. A person skilled in the art is able to understand that the baseband processor and the central processing unit alternatively is separate processors, and are interconnected by using a technology such as a bus. A person skilled in the art is able to understand that the terminal device includes a plurality of baseband processors to adapt to different network standards. The terminal device includes a plurality of central processing units to enhance a processing capability of the terminal device. Components of the terminal device is connected through various buses. The baseband processor alternatively is expressed as a baseband processing circuit or a baseband processing chip. The central processing unit alternatively is expressed as a central processing circuit or a central processing chip. A function of processing a communication protocol and communication data is built in the processor, or is stored in the storage unit in a form of a software program, and the processor executes the software program to implement a baseband processing function.

As shown in FIG. 14, the terminal device 700 includes a transceiver unit 710 and a processing unit 720. The transceiver unit further is referred to as a transceiver, a transceiver machine, a transceiver apparatus, or the like. Optionally, a component that is in the transceiver unit 710 and that is configured to implement a receiving function is considered as a receiving unit, and a component that is in the transceiver unit 710 and that is configured to implement a sending function is considered as a sending unit. In other words, the transceiver unit 510 includes a receiving unit and a sending unit. For example, the receiving unit further is referred to as a receiver, a receive machine, or a receiving circuit, and the sending unit further is referred to as a transmitter, a transmit machine, or a transmitting circuit.

The terminal device shown in FIG. 14 performs actions performed by the user equipment in the foregoing method 100, 200, 300, 400, or 500. To avoid repetition, detailed descriptions thereof are omitted herein.

In some embodiments, in some embodiments, the processor is a central processing unit (central processing unit, CPU), or is another general-purpose processor, a digital signal processor (digital signal processor, DSP), an application-specific integrated circuit (application-specific integrated circuit, ASIC), a field programmable gate array (field programmable gate array, FPGA), or another programmable logic device, discrete gate, transistor logic device, discrete hardware component, or the like. The general-purpose processor is a microprocessor, or the processor is any conventional processor or the like.

In some embodiments, the memory in some embodiments are a volatile memory or a nonvolatile memory, or includes a volatile memory and a nonvolatile memory. The nonvolatile memory is a read-only memory (Read-only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory is a random access memory (Random access memory, RAM), used as an external cache. By way of example, and not limitation, random access memories (Random access memories, RAMs) in many forms are available, for example, a static random-access memory (Static RAM, SRAM), a dynamic random-access memory (DRAM), a synchronous dynamic random access memory (Synchronous DRAM, SDRAM), a double data rate synchronous dynamic random access memory (Double data rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct rambus RAM, DR RAM).

All or some of the foregoing embodiments are implemented by software, hardware, firmware, or any combination thereof. In response to the software being used to implement the embodiments, the foregoing embodiments are implemented completely or partially in a form of a computer program product. The computer program product includes one or more computer instructions or computer programs. In response to the program instructions or the computer programs being loaded or executed on a computer, procedures or functions according to some embodiments are all or partially generated. The computer is a general-purpose computer, a dedicated computer, a computer network, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), or a semiconductor medium. The semiconductor medium is a solid-state drive.

The term "and/or" in some embodiments describes an association relationship between associated objects and represents that three relationships exists. For example, A and/or B represents the following three cases: A exists, both A and B exist, and B exists. In addition, the character "/" in some embodiments generally represents an "or" relationship between associated objects.

Sequence numbers of the foregoing processes do not mean execution sequences in various some embodiments. The execution sequences of the processes are determined based on functions and internal logic of the processes. This is unable to be construed as any limitation on the implementation processes of some embodiments.

A person of ordinary skill in the art is aware that, in combination with the examples described in embodiments disclosed in some embodiments, units and algorithm steps are implemented by electronic hardware or a combination of computer software and electronic hardware. Whether the functions are performed by hardware or software depends on particular applications and design constraint conditions of the technical solutions. A person skilled in the art is able to use different methods to implement the described functions for each particular application, but that the implementation goes beyond the scope of the embodiments is unconsidered. A person skilled in the art that, for the purpose of convenient and brief description, for a detailed working process of the foregoing system, apparatus, and unit, refer to a corresponding process in the foregoing method embodiments. Details are not described herein again. In the several embodiments provided in some embodiments, the disclosed system, apparatus, and method is implemented in other manners. For example, the described apparatus embodiment is an example. For example, division into the units is a logical function division and is another division during implementation. For example, a plurality of units or components are combined or integrated into another system, or some features are ignored or not performed. In addition, a displayed or discussed mutual coupling or direct coupling or communication connection is implemented through some interfaces. An indirect coupling or communication connection between apparatuses or units are implemented in electronic, mechanical, or other forms.

The units described as separate components are or are not be physically separate, and components displayed as units are or are not be physical units, that is, is located at one position, or is distributed on a plurality of network units. Some or all of the units are selected based on an condition to achieve an objective of the solutions of the embodiments. In addition, functional units in some embodiments are integrated into one processing unit, each of the units exists alone physically, or two or more units are integrated into one unit. In response to the functions being implemented in a form of a software functional unit and sold or used as an independent product, the functions are stored in a computer-readable storage medium. Based on such an understanding, the technical solutions of this application, or a part contributing to the conventional technology, or some of the technical solutions are embodied in a form of a software product. The computer software product is stored in a storage medium, and includes several instructions for enabling a computer device (which is a personal computer, a server, a network device, or the like) to perform all or some of the steps of the methods described in some embodiments. The foregoing storage medium includes any medium that stores a program code, such as a USB flash drive, a removable hard disk, a read-only memory (Read-Only Memory, ROM), a random access memory (Random Access Memory, RAM), a magnetic disk, or an optical disc.

The foregoing descriptions are implementations of the embodiments, but are unintended to limit the protection scope of the embodiments. Any variation or replacement readily figured out by a person skilled in the art within the technical scope disclosed in the embodiments fall within the protection scope of the embodiments. Therefore, the protection scope of the embodiments are subject to the protection scope of the claims.

What is claimed is:

1. A man-in-the-middle detection method, comprising:
receiving, by a communication apparatus in a first physical frame, a first radio resource control (RRC) message from user equipment (UE);
receiving, by the communication apparatus, a second RRC message from the UE, wherein the second RRC message includes frame information of a second physical frame, and security protection is performed on the first RRC message and the second RRC message through an access stratum (AS) security context established by the UE and the communication apparatus; and
determining, by the communication apparatus, whether the first physical frame matches the second physical frame.

2. The method according to claim 1, wherein:
the frame information of the second physical frame includes a frame number and a subframe number of the second physical frame.

3. The method according to claim 2, wherein the determining whether the first physical frame matches the second physical frame comprises:
in response to a frame number of the first physical frame being the same as the frame number of the second physical frame and a subframe number of the first physical frame being the same as the subframe number of the second physical frame, determining, by the communication apparatus, that the first physical frame matches the second physical frame; otherwise,
determining, by the communication apparatus, that the first physical frame does not match the second physical frame.

4. The method according to claim 1, further comprising:
in response to the receiving, in the first physical frame, the first RRC message from the UE,
storing, by the communication apparatus, frame information of the first physical frame.

5. The method according to claim 1, further comprising:
prior to the receiving, in the first physical frame, the first RRC message from the UE,
establishing, by the communication apparatus, the AS security context with the UE.

6. The method according to claim 1, further comprising:
prior to the receiving, in the first physical frame, the first RRC message from the UE, sending, by the communication apparatus, indication information to the UE, wherein the indication information indicates the UE is to enable man-in-the-middle detection.

7. A man-in-the-middle detection method, comprising:
sending, by communication apparatus in a second physical frame, a first radio resource control (RRC) message to a base station; and
sending, by the communication apparatus, a second RRC message to the base station, wherein the second RRC message includes frame information of the second physical frame, and security protection is performed on the first RRC message and the second RRC message through an access stratum (AS) security context established by the communication apparatus and the base station.

8. The method according to claim 7, wherein:
the frame information of the second physical frame includes a frame number and a subframe number of the second physical frame.

9. The method according to claim 7, further comprising:
prior to the sending, in the second physical frame, the first RRC message to the base station,
receiving, by the communication apparatus, downlink control information (DCI), wherein the DCI is usable to determine the frame information of the second physical frame; and
storing, by the communication apparatus, the frame information of the second physical frame.

10. The method according to claim 7, further comprising:
prior to the sending, in the second physical frame, the first RRC message to the base station,
accessing, by the communication apparatus, the base station, and establishing the AS security context with the base station.

11. The method according to claim 7, wherein:
the sending, in the second physical frame, the first RRC message to the base station comprises:
in response to a preset rule being met, sending, by the communication apparatus in the second physical frame, the first RRC message to the base station.

12. The method according to claim 11, wherein:
the preset rule includes:
receiving, by the communication apparatus, indication information sent by the base station, wherein the indication information indicates the communication apparatus is to enable man-in-the-middle detection; or
determining, by the communication apparatus, that user plane integrity protection between the communication apparatus and the base station is not enabled.

13. A communication apparatus, wherein the apparatus comprises:
a processor;
a memory operably connected to the processor, that is configured to execute a computer program stored in the memory to enable the communication apparatus to:
send, in a second physical frame, a first radio resource control (RRC) message to a base station; and
send a second RRC message to the base station, wherein the second RRC message includes frame information of the second physical frame, and security protection is performed on the first RRC message and the second RRC message through an access stratum (AS) security context established by the communication apparatus and the base station.

14. The communication apparatus according to claim 13, wherein:
the frame information of the second physical frame includes a frame number and a subframe number of the second physical frame.

15. The communication apparatus according to claim 13, wherein the processor is configured to execute the computer program to enable the communication apparatus to:
receive downlink control information (DCI), wherein the DCI is used to determine the frame information of the second physical frame; and
storing the frame information of the second physical frame.

16. The communication apparatus according to claim 13, wherein the processor is configured to execute the computer program to enable the communication apparatus to:
access the base station; and
establish the AS security context with the base station.

17. The communication apparatus according to claim 13, wherein:
the sending, in the second physical frame, the first radio resource control RRC message to the base station comprises:
in response to a preset rule being met, sending, in the second physical frame, the first RRC message to the base station.

18. The communication apparatus according to claim 17, wherein:
the preset rule includes:
receive indication information sent by the base station, wherein the indication information indicates the communication apparatus is to enable man-in-the-middle detection; or
determine that user plane integrity protection between the communication apparatus and the base station is not enabled.

19. A communication apparatus, comprises:
a processor;
a memory operably connected to the processor, the processor configured to execute a computer program stored in the memory to enable the communication apparatus to:
send in a first physical frame, a first radio resource control (RRC) message to a base station; and
send a second RRC message to the base station, wherein the second RRC message includes frame information of a second physical frame, and security protection is performed on the first RRC message and the second RRC message through an access stratum (AS) security context established by the communication apparatus and the base station.

20. The communication apparatus according to claim 19, wherein the processor is configured to execute the computer program to enable the communication apparatus to:
receive downlink control information (DCI), wherein the DCI is used to determine the frame information of the second physical frame; and
store the frame information of the second physical frame.

* * * * *